United States Patent
Tsuji

(10) Patent No.: US 9,432,496 B2
(45) Date of Patent: Aug. 30, 2016

(54) MOBILE TERMINAL, SELECTION PROCESSING METHOD

(71) Applicant: KYOCERA Document Solutions Inc., Osaka-shi, Osaka (JP)

(72) Inventor: Takuya Tsuji, Osaka (JP)

(73) Assignee: KYOCERA Document Solutions Inc., Osaka-shi (JP)

( * ) Notice: Subject to any disclaimer, the term of this patent is extended or adjusted under 35 U.S.C. 154(b) by 0 days.

(21) Appl. No.: 14/700,054

(22) Filed: Apr. 29, 2015

(65) Prior Publication Data

US 2015/0350402 A1    Dec. 3, 2015

(30) Foreign Application Priority Data

May 30, 2014   (JP) ................. 2014-112594

(51) Int. Cl.
| | |
|---|---|
| H04M 1/725 | (2006.01) |
| G06F 3/041 | (2006.01) |
| G06F 1/16 | (2006.01) |
| G06F 3/0488 | (2013.01) |
| G06F 3/0346 | (2013.01) |
| G06F 3/0484 | (2013.01) |

(52) U.S. Cl.
CPC ........ H04M 1/72519 (2013.01); G06F 1/1694 (2013.01); G06F 3/0346 (2013.01); G06F 3/0412 (2013.01); G06F 3/04842 (2013.01); G06F 3/04886 (2013.01); H04M 1/72522 (2013.01); *G06F 2200/1637* (2013.01)

(58) Field of Classification Search
CPC ............. H04M 1/72519; H04M 1/72522; H04M 2250/12; G06F 3/017; G06F 1/1694; G06F 3/0412; G06F 3/04886; G06F 3/04842; G06F 3/0346; G06F 2200/1637

USPC .................. 455/556.1, 566, 556.2
See application file for complete search history.

(56) References Cited

U.S. PATENT DOCUMENTS

2002/0082048 A1*  6/2002  Toyoshima .......... H04B 1/3816
                                                             455/557
2005/0003870 A1   1/2005  Nakano et al.
(Continued)

FOREIGN PATENT DOCUMENTS

| JP | 2004038308 A | 2/2004 |
| WO | 2013031281 A1 | 3/2013 |

OTHER PUBLICATIONS

European Patent Office, Extended European Search Report Issued in Application No. 15164388.9, Oct. 1, 2015, Germany, 8 pages.

*Primary Examiner* — Raymond Dean
(74) *Attorney, Agent, or Firm* — Alleman Hall McCoy Russell & Tuttle LLP

(57) ABSTRACT

A mobile terminal includes a motion detecting portion, a display processing portion, a touch detecting portion, and a selection processing portion. The motion detecting portion detects a motion of shaking the mobile terminal and a direction toward which the mobile terminal was shaken. The display processing portion displays a plurality of pieces of information on a display portion as selection candidates. The touch detecting portion detects a touch operation that is performed to select a piece of information from the plurality of pieces of information. The selection processing portion, when the motion detecting portion has detected the motion of shaking, selects, as processing targets, one or more pieces of information from the plurality of pieces of information based on the detected direction toward which the mobile terminal was shaken and a position of the piece of information selected by the touch operation detected by the touch detecting portion.

8 Claims, 9 Drawing Sheets

(56) References Cited

U.S. PATENT DOCUMENTS

2007/0075969 A1* 4/2007 Oh .................. G06F 1/1624
                                                         345/158
2010/0134312 A1   6/2010 Park et al.
2011/0053641 A1*  3/2011 Lee .................. G06F 1/1626
                                                         455/556.1
2014/0223370 A1   8/2014 Matsuo

* cited by examiner

MOBILE TERMINAL, SELECTION PROCESSING METHOD

INCORPORATION BY REFERENCE

This application is based upon and claims the benefit of priority from the corresponding Japanese Patent Application No. 2014-112594 filed on May 30, 2014, the entire contents of which are incorporated herein by reference.

BACKGROUND

The present disclosure relates to a mobile terminal that performs an information selection process and to a selection processing method executed in the mobile terminal.

There is known a configuration in a mobile terminal or the like such as a PDA where one or more pieces of information can be selected as processing targets from a plurality of pieces of information displayed on an operation screen, and then the selected one or more pieces of information can be deleted at once in response to an operation.

SUMMARY

A mobile terminal according to an aspect of the present disclosure includes a motion detecting portion, a display processing portion, a touch detecting portion, and a selection processing portion. The motion detecting portion detects a motion of shaking the mobile terminal and a direction toward which the mobile terminal was shaken. The display processing portion displays a plurality of pieces of information on a display portion as selection candidates. The touch detecting portion detects a touch operation that is performed to select a piece of information from the plurality of pieces of information. The selection processing portion, when the motion detecting portion has detected the motion of shaking the mobile terminal, selects, as processing targets, one or more pieces of information from the plurality of pieces of information based on the direction toward which the mobile terminal was shaken that was detected by the motion detecting portion and a position of the piece of information selected by the touch operation detected by the touch detecting portion.

A mobile terminal according to another aspect of the present disclosure includes a motion detecting portion, a display processing portion, a touch detecting portion, and a selection processing portion. The motion detecting portion detects a motion of shaking the mobile terminal and a direction toward which the mobile terminal was shaken. The display processing portion displays a plurality of pieces of information on a display portion as selection candidates. The touch detecting portion detects a touch operation that is performed to select a piece of information from the plurality of pieces of information. The selection processing portion, when the motion detecting portion has detected the motion of shaking the mobile terminal, selects, as processing targets, one or more pieces of information other than the piece of information selected by the touch operation detected by the touch detecting portion.

A selection processing method according to a further aspect of the present disclosure is a selection processing method executed in a mobile terminal that includes a display processing portion configured to display a plurality of pieces of information on a display portion as selection candidates and a touch detecting portion configured to detect a touch operation that is performed to select a piece of information from the plurality of pieces of information. The selection processing method includes: a motion detecting step of detecting a motion of shaking the mobile terminal and a direction toward which the mobile terminal was shaken; and a selection processing step of, when the step of detecting has detected the motion of shaking the mobile terminal, selecting, as processing targets, one or more pieces of information from the plurality of pieces of information based on the direction toward which the mobile terminal was shaken and a position of the piece of information selected by the touch operation detected by the touch detecting portion.

A selection processing method according to a still further aspect of the present disclosure is a selection processing method executed in a mobile terminal that includes a display processing portion configured to display a plurality of pieces of information on a display portion as selection candidates and a touch detecting portion configured to detect a touch operation that is performed to select a piece of information from the plurality of pieces of information. The selection processing method includes: a motion detecting step of detecting a motion of shaking the mobile terminal; and a selection processing step of, when the step of detecting has detected the motion of shaking the mobile terminal, selecting, as processing targets, one or more pieces of information other than the piece of information selected by the touch operation detected by the touch detecting portion.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

First Embodiment

The following describes an embodiment of the present disclosure with reference to the accompanying drawings for the understanding of the disclosure. It should be noted that the following description is an example of a specific embodiment of the present disclosure and should not limit the technical scope of the disclosure. In addition, the contents of the embodiments described below may be combined as appropriate.

<Mobile Terminal 10>

First, the configuration of a mobile terminal 10 according to an embodiment of the present disclosure is described with reference to FIG. 1.

Figure 1:
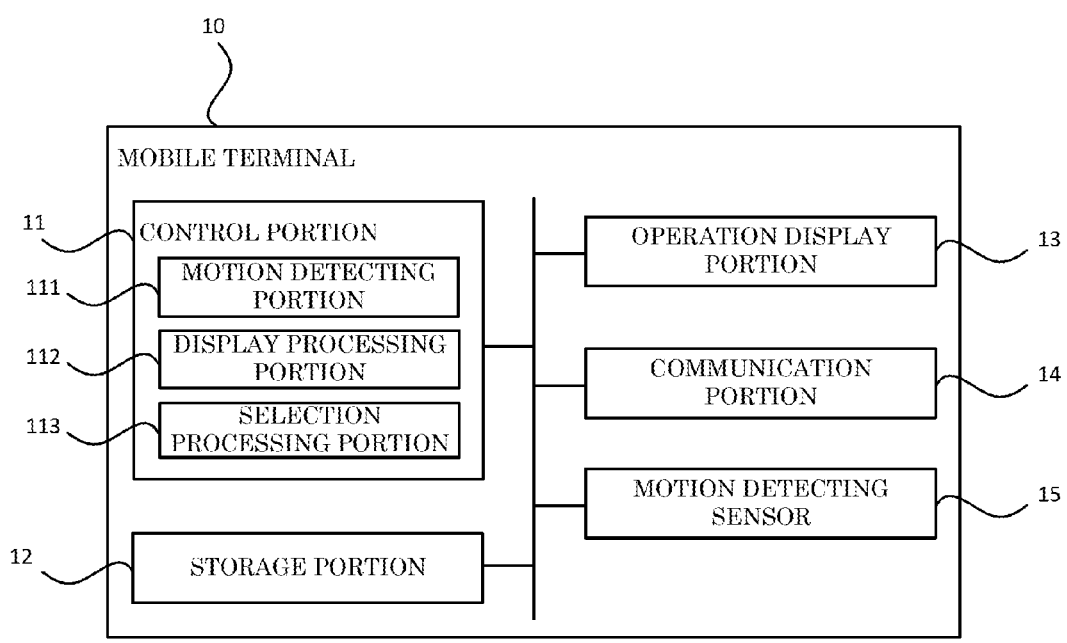
FIG. 1 is a block diagram showing the configuration of a mobile terminal according to an embodiment of the present disclosure.

As shown in FIG. 1, the mobile terminal 10 includes a control portion 11, a storage portion 12, an operation display portion 13, a communication portion 14, and a motion detecting sensor 15. The mobile terminal 10 is a mobile communication terminal that can be carried by the user, and is, for example, a smartphone, a mobile phone, a tablet terminal, or a PDA.

The control portion 11 includes control equipment such as CPU, ROM, RAM, and EEPROM that are not shown, and controls the operation of the mobile terminal 10 by executing control programs stored in the ROM, by using the CPU. It is noted that the control portion 11 may be an electronic circuit such as an integrated circuit (ASIC).

The storage portion 12 may be a nonvolatile storage such as a flash memory, and the control portion 11 can read and write information from/to the storage portion 12. Specifically, the storage portion 12 stores various types of control programs that are executed by the control portion 11. In addition, the storage portion 12 stores information of various types of contents such as e-mails, texts, tables, images, and photographs.

The operation display portion 13 includes a display portion and an operation portion. The display portion is, for example, a liquid crystal panel that displays various types of information in response to control instructions from the control portion 11. The operation portion includes a touch panel for detecting a touch operation of the user touching an operation key displayed on the display portion. It is noted that the operation display portion 13 is an example of the display portion and the touch detecting portion.

The communication portion 14 performs a communication with an external apparatus based on a predetermined wireless communication standard. Specifically, the communication portion 14 can execute a wireless communication with an external communication apparatus based on Bluetooth (registered trademark). It is noted that the communication portion 14 may perform communications based on another short-distance wireless communication standard such as NFC (Near Field Communication) or a wireless LAN standard such as an IEEE standard.

The motion detecting sensor 15 is, for example, a three-axis acceleration sensor that detects motions of the mobile terminal 10 in the horizontal and vertical directions (up-down direction, left-right direction and front-rear direction), and detects the presence/absence of a motion of shaking the mobile terminal 10 and the direction toward which the mobile terminal 10 was shaken. It is noted that the motion detecting sensor 15 may include one or more vibration sensors, acceleration sensors, displacement sensors or the like as far as it can detect the motion of shaking the mobile terminal 10.

Meanwhile, in the mobile terminal 10, the user may select, as processing targets, a plurality of pieces of information on an operation screen displayed on the mobile terminal 10. A problem in that case is the troublesome that the user may feel when he/she has to perform a plurality of operations to select the plurality of pieces of information as the processing targets. On the other hand, as described below, in the mobile terminal 10 of the present embodiment, it is possible to select with ease, as the processing targets, a plurality of pieces of information from among a plurality of pieces of information displayed on the operation screen.

Specifically, the control portion 11 functions as a motion detecting portion 111, a display processing portion 112, and a selection processing portion 113 when the control portion 11 executes, by using the CPU, the control programs stored in the ROM.

The motion detecting portion 111 executes a process for detecting the presence or absence of the motion of shaking the mobile terminal 10 and the direction toward which the mobile terminal 10 was shaken, by using the motion detecting sensor 15. The display processing portion 112 displays a plurality of pieces of information as selection candidates on the operation display portion 13. The selection processing portion 113 selects, as processing targets, one or more pieces of information and executes various types of predetermined processes such as a delete process and a print process.

[Information Selection Process]

Figure 2:
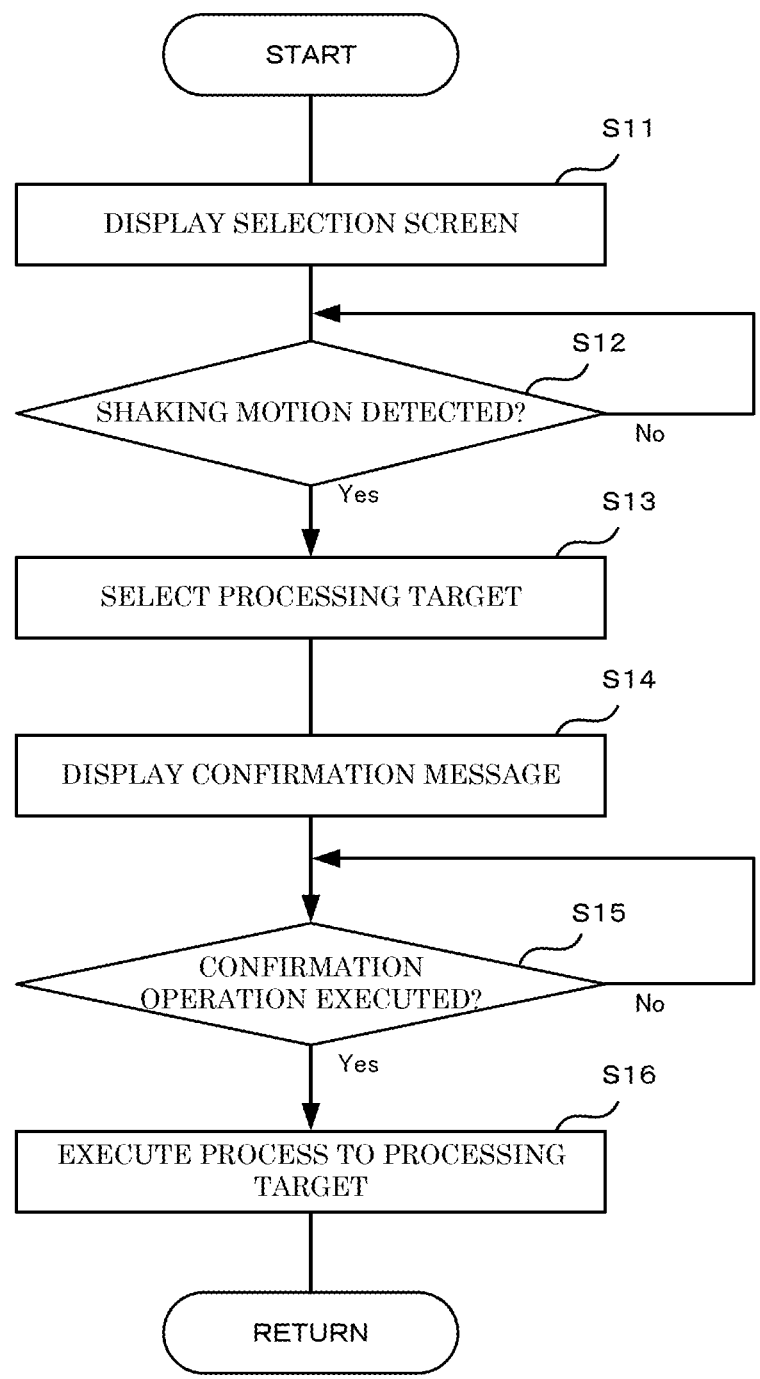
FIG. 2 is a flowchart showing an example of an information selection process that is executed by the mobile terminal according to an embodiment of the present disclosure.

The following describes an example of the procedure of an information selection process that is executed by the control portion 11 based on the control programs in the mobile terminal 10, with reference to the flowchart shown in FIG. 2. The information selection process is executed by the control portion 11 when, for example, an operation for referring to various types of information is performed and a list of information is displayed on the mobile terminal 10 as candidates for processing targets of a certain process. The following describes, as one example, a case where the delete process is selected as the process to be performed and the information selection process is executed by the control portion 11 for the delete process. It is noted that the present disclosure may be regarded as an invention of a selection processing method in which the control portion 11 executes the procedures of the information selection process.

<Step S11>

First, in step S11, the control portion 11 displays a selection screen on the operation display portion 13 in such a way as to allow one or more pieces of information to be selected as processing targets. It is noted that one or more pieces of information are displayed on the selection screen as selection candidates. The process of step S11 is executed by the display processing portion 112 of the control portion 11.

Specifically, the control portion 11 is configured to display, as the selection candidates, a list of one or more pieces of information on the operation display portion 13, wherein the one or more pieces of information are stored in the storage portion 12 of the mobile terminal 10. In addition, the control portion 11 may be configured to display, for example, a plurality of e-mails as the selection candidates, by running software that executes transmission and reception of e-mails.

Figure 3A:
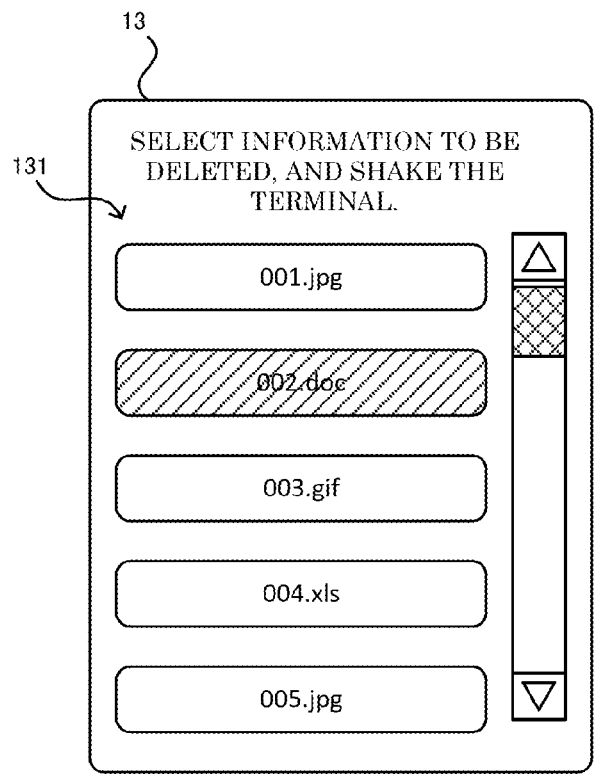
FIG. 3A, FIG. 3B and FIG. 3C are diagrams showing examples of execution results of the information selection process that is executed by the mobile terminal according to the first embodiment of the present disclosure.

In the example shown in FIG. 3A, a candidate display area 131 is displayed on the operation display portion 13, wherein one or more selection candidates for the processing targets of the delete process are displayed in the candidate display area 131. Specifically, in the example shown in FIG. 3A, five pieces of information, namely, "001.jpg", "002.doc", "003.gif", "004.xls" and "005.jpg", are displayed in the candidate display area 131. In addition, the example of FIG. 3A shows a state where information "002.doc" is selected from the five pieces of information by the touch operation of the user.

<Step S12>

Next, in step S12, the control portion 11 determines, by using the motion detecting sensor 15, whether or not the motion of shaking the mobile terminal 10 was detected. It is noted that the process of step S12 is executed by the motion detecting portion 111 of the control portion 11. Here, the motion of shaking the mobile terminal 10 may be, for example, a motion of moving the mobile terminal 10 in one direction, or a reciprocal motion of moving the mobile terminal 10 in one direction and pulling it back in the opposite direction. As another example, the control portion 11 may recognize a motion of reciprocally moving the mobile terminal 10 a plurality of times as the motion of shaking the mobile terminal 10. Upon determining that the motion of shaking the mobile terminal 10 was detected (Yes side at S12), the control portion 11 moves the process to step S13. On the other hand, upon determining that the motion of shaking the mobile terminal 10 has not been detected (No side at S12), the control portion 11 repeatedly executes the determination process of step S12.

In addition, in step S12, when the acceleration or the movement amount of the movement of the mobile terminal 10 that was measured by the motion detecting portion 111 by using the motion detecting sensor 15, is equal to or larger than a predetermined amount, the control portion 11 may determine that the motion of shaking the mobile terminal 10 was detected. With this configuration, if, before actually shaking the mobile terminal 10, the user pulls it back a little in an opposite direction to the direction in which the user had intended to shake, only the motion in the originally intended direction is detected and the motion in the opposite direction is not detected.

<Step S13>

In step S13, the control portion 11 selects one or more pieces of information as the processing targets, based on a piece of information that is currently selected on the operation display portion 13. Specifically, the control portion 11 selects one or more pieces of information as the processing candidates, based on the position of the piece of information that is currently selected on the operation display portion 13, and the direction, detected by the motion detecting portion 111, toward which the mobile terminal 10 was shaken. The process of step S13 is executed by the selection processing portion 113 of the control portion 11.

Figure 3B:
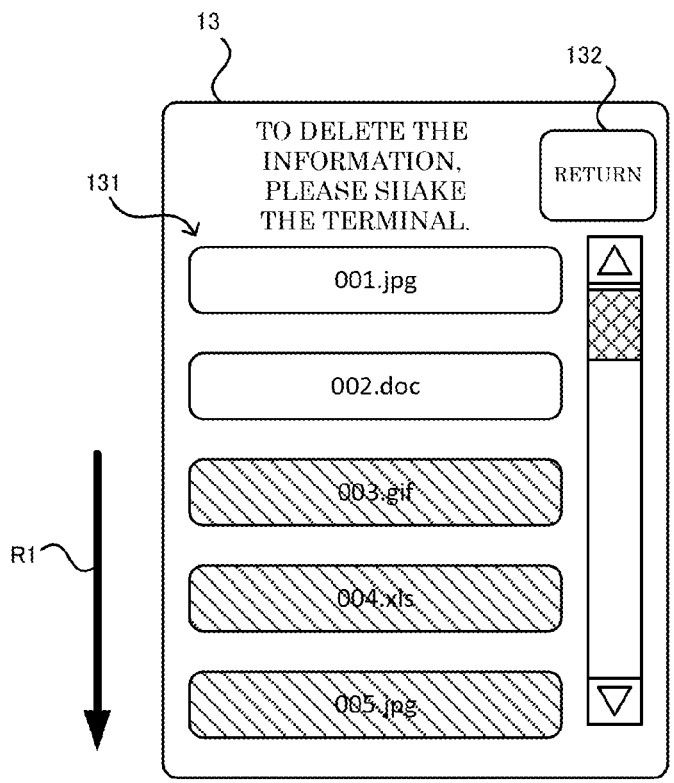

For example, the control portion 11 may select, as the processing targets, one or more pieces of information that are displayed on the operation display portion 13 more on the side of the direction toward which the mobile terminal 10 was shaken, than the piece of information that has been selected by the touch operation and is displayed on the operation display portion 13. That is, when the motion of shaking the mobile terminal 10 in the downward direction R1 is detected as shown in FIG. 3B, in the operation state shown in FIG. 3A in which the operation display portion 13 is selected by the touch operation, three pieces of information "003.gif", "004.xls" and "005.jpg" that are displayed below the information "002.doc" (more on the side of the downward direction R1 than "002.doc") are selected as the processing targets. In addition, when the mobile terminal 10 is shaken in an upward direction that is opposite to the downward direction R1, only "001.jpg" that is displayed above the information "002.doc" (more on the side of the upward direction than "002.doc") is selected as the processing target.

It is noted that in the present embodiment, among the pieces of information that are displayed within the operation screen of the operation display portion 13, one or more pieces of information that are displayed below the information "002.doc" (more on the side of the downward direction R1 than "002.doc") are selected as the processing targets. That is, as another embodiment, all of one or more pieces of information including those that are not currently displayed on the operation display portion 13 but are present below the information "002.doc" (more on the side of the downward direction R1 than "002.doc") and can be displayed by scrolling or the like, may be selected as the processing targets.

In addition, when the motion of shaking the mobile terminal 10 detected in step S12 is a reciprocal motion of the mobile terminal 10, the direction of the first movement is detected as the direction toward which the mobile terminal 10 was shaken, for example. In that case, when the acceleration or the movement amount of the first movement of the mobile terminal 10 that was measured by the motion detecting portion 111 by using the motion detecting sensor 15, is equal to or larger than a predetermined amount, the control portion 11 determines the direction of the first movement as the direction toward which the mobile terminal 10 was shaken.

<Step S14>

Subsequently, in step S14, the control portion 11 displays a confirmation message on the operation display portion 13 to confirm whether or not it is necessary to execute a process regarding the information selected in step S13. For example, the confirmation message may be "To delete the information, please shake the terminal", as shown in FIG. 3B. With this configuration, the user can confirm the selected pieces of information and the content of the process to be executed onto the selected pieces of information. This prevents the process from being executed erroneously.

<Step S15>

Next, in step S15, the control portion 11 determines whether or not a predetermined confirmation operation was executed in response to the confirmation message displayed in step S14. Specifically, the confirmation operation is the motion of shaking the mobile terminal 10 being performed again. It is noted that in this step, the control portion 11 only determines whether or not the motion of shaking the mobile terminal 10 was performed, and does not need to determine the direction toward which the mobile terminal 10 was shaken.

Here, upon determining that the confirmation operation was executed (Yes side at step S15), the control portion 11 moves the process to step S16. On the other hand, upon determining that the confirmation operation has not been executed (No side at step S15), the control portion 11 repeatedly executes the determination process of step S15. In addition, when a predetermined cancellation operation is performed, the control portion 11 returns the process to step S11. It is noted that the cancellation operation may be, for example, an operation of a "return" key 132 displayed on the operation screen.

<Step S16>

Figure 3C:
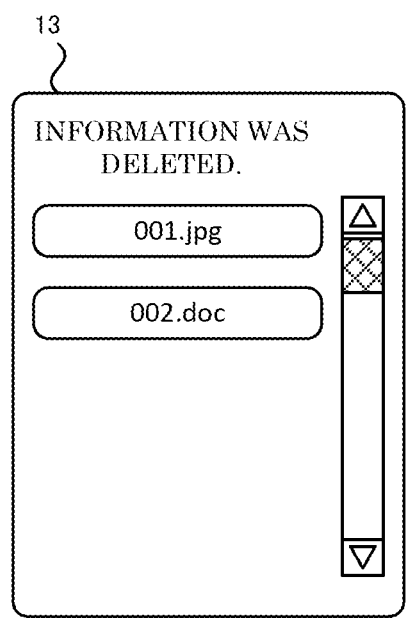

In step S16, the control portion 11 executes a predetermined process such as the delete process to the one or more pieces of information that were selected as the processing targets in step S13. For example, when the motion of shaking the mobile terminal 10 is detected in the operation state shown in FIG. 3B, the three pieces of information "003.gif", "004.xls" and "005.jpg" that have been selected as the processing targets are deleted as shown in FIG. 3C. The process of step S16 is executed by the selection processing portion 113 of the control portion 11.

It is noted that the present embodiment describes, as one example, a case where the delete process is executed to one or more pieces of information that have been selected as the processing targets. The present disclosure, however, is not limited to such a case. For example, in step S16, a print process, a copy process, a cutting process, a moving process, an e-mail transmission process, a facsimile transmission process, or other process may be executed to the one or more pieces of information that have been selected as the processing targets. In addition, the present embodiment describes, as one example, a case where the processing targets are selected from among information stored in the storage portion 12 of the mobile terminal 10. The present disclosure, however, is not limited to such a case. For example, in the case where the mobile terminal 10 can communicate with an external apparatus such as a personal computer, an image forming apparatus, or a TV receiver, the control portion 11 may select, as the processing targets, one or more pieces of information that are stored in the external apparatus.

As described above, in the mobile terminal 10, the user can select the processing targets easily and smoothly by shaking the mobile terminal 10 without the need to perform a plurality of operations to select a plurality of pieces of information.

Second Embodiment

The first embodiment describes, as one example, a case where steps S14 through S15 are executed to make confirmation on the user operations before the delete process is executed in step S16. On the other hand, in another embodiment, steps S14 through S15 may be omitted. That is, when the motion of shaking the mobile terminal 10 is detected in step S12, one or more pieces of information are selected as the processing targets in step S13, and a process such as the delete process may be immediately executed to the selected processing targets.

Furthermore, in that case, the control portion 11 may not execute the processes of selecting and deleting the information even if the motion detecting portion 111 detects the motion of shaking the mobile terminal 10, until a predetermined wait time passes after the motion detecting portion 111 detects the motion of shaking the mobile terminal 10. In other words, the control portion 11 executes the processes of selecting and deleting the information when the mobile terminal 10 is shaken after the wait time has passed after the mobile terminal 10 was shaken and information was deleted. This prevents information from being deleted erroneously by the motion of returning the mobile terminal 10 after shaking it in one direction.

In addition, the control portion 11 may not execute the selection and deletion of the information even if the motion detecting portion 111 of the mobile terminal 10 detects the motion of shaking the mobile terminal 10, unless, after a touch operation performed on the operation display portion 13 is cancelled after the detection of the motion of shaking the mobile terminal 10 by the motion detecting portion 111, the touch operation is performed again. This also prevents information from being deleted erroneously by the motion of returning the mobile terminal 10 after shaking it in one direction.

Third Embodiment

In the third and fourth embodiments, other examples of the selection screen displayed in the step S11 and the selection process performed in the step S13 are described with reference to FIG. 4A, FIG. 4B and FIG. 4C.

Figure 4A:
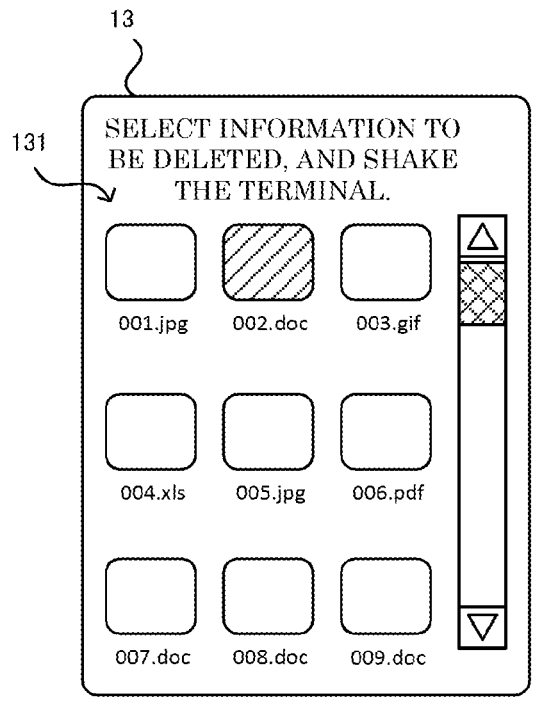
FIG. 4A, FIG. 4B, FIG. 4C, FIG. 4D and FIG. 4E are diagrams showing examples of execution results of the information selection process that is executed by the mobile terminal according to the third embodiment of the present disclosure.

In the example shown in FIG. 4A, the candidate display area 131 is displayed on the operation display portion 13, where one or more pieces of information are displayed in the candidate display area 131 as the selection candidates for the processing targets. Specifically, in the example shown in FIG. 4A, nine pieces of information "001.jpg", "002.doc", "003.gif", "004.xls", "005.jpg", "006.doc", "007.doc", "008.doc" and "009.doc" are displayed in the candidate display area 131. In addition, the example shown in FIG. 4A indicates that from among the nine pieces of information, information "002.doc" is selected by the touch operation of the user.

Figure 4B:
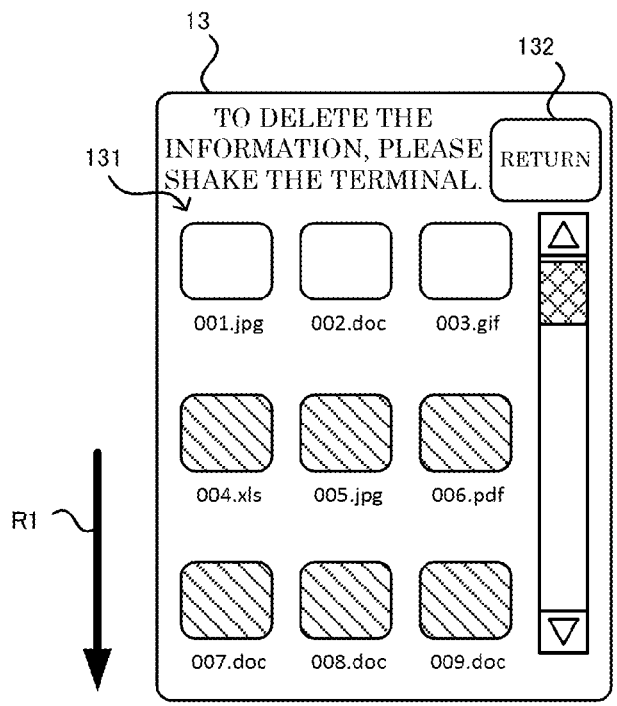

Next, when, in the operation state shown in FIG. 4A in which "002.doc" is selected on the operation display portion 13, the motion of shaking the mobile terminal 10 toward the downward direction R1 is detected as shown in FIG. 4B, six pieces of information "004.xls", "005.jpg", "006.doc", "007.doc", "008.doc" and "009.doc" that are displayed below the information "002.doc" (more on the side of the downward direction R1 than "002.doc") are selected as the processing targets. It is noted that as another selection method for the case where, in the operation state shown in FIG. 4A in which "002.doc" is selected on the operation display portion 13, the motion of shaking the mobile terminal 10 toward the downward direction R1 is detected as shown in FIG. 4B, seven pieces of information "003.gif", "004.xls", "005.jpg", "006.doc", "007.doc", "008.doc" and "009.doc" that are lower than "002.doc" in the display order may be selected as the processing targets.

Figure 4C:
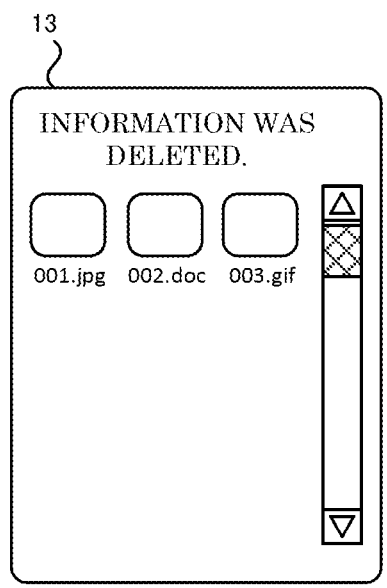

Subsequently, when the motion of shaking the mobile terminal 10 is detected in the operation state shown in FIG. 4B, the six pieces of information "004.xls", "005.jpg", "006.doc", "007.doc", "008.doc" and "009.doc" that have been selected as the processing targets are deleted as shown in FIG. 4C.

Figure 4D:
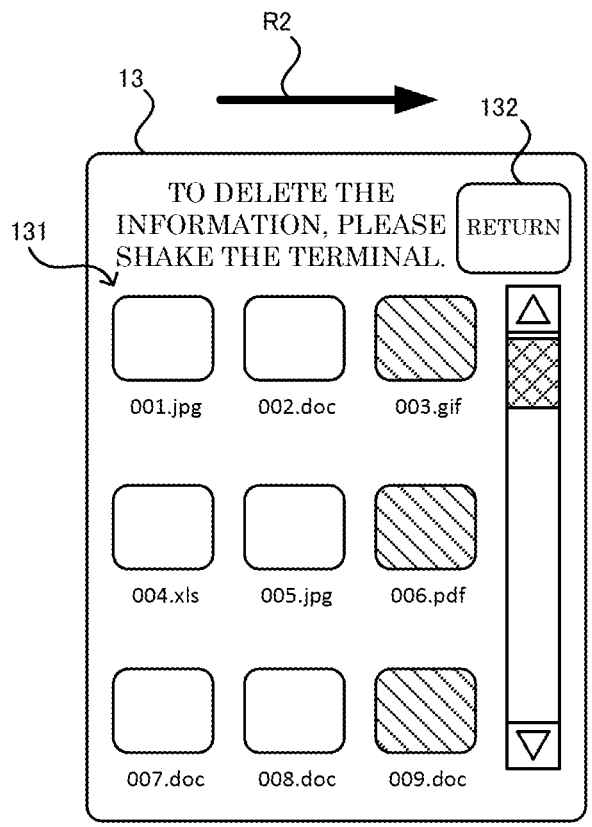

On the other hand, when, in the operation state shown in FIG. 4A in which "002.doc" is selected on the operation display portion 13, the motion of shaking the mobile terminal 10 toward a rightward direction R2 is detected as shown in FIG. 4D, three pieces of information "003.gif", "006.doc" and "009.doc" that are displayed more on the side of the rightward direction R2 than "002.doc" are selected as the processing targets.

Figure 4E:
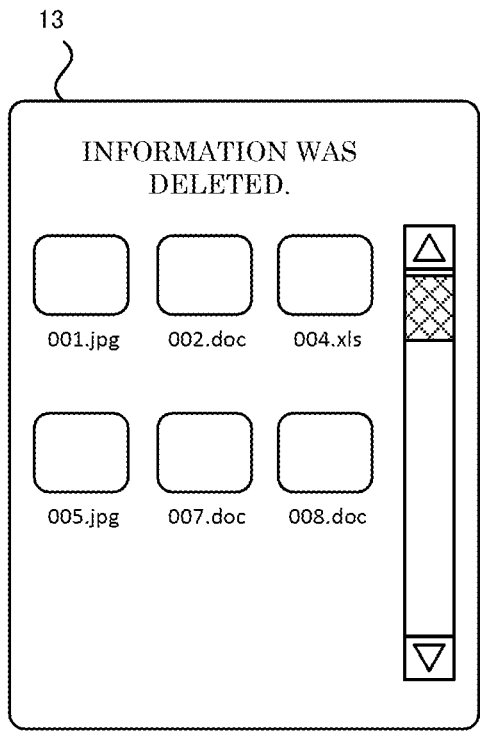

Subsequently, when the motion of shaking the mobile terminal 10 is detected in the operation state shown in FIG. 4D, the three pieces of information "003.gif", "006.doc" and "009.doc" that have been selected as the processing targets are deleted as shown in FIG. 4E.

Fourth Embodiment

In step S13, the control portion 11 may select one or more pieces of information as the processing targets, as follows. That is, in step S13, the control portion 11 may select, as the processing targets, all information other than a piece of information that has been selected by the touch operation detected by the operation display portion 13.

Figure 5A:
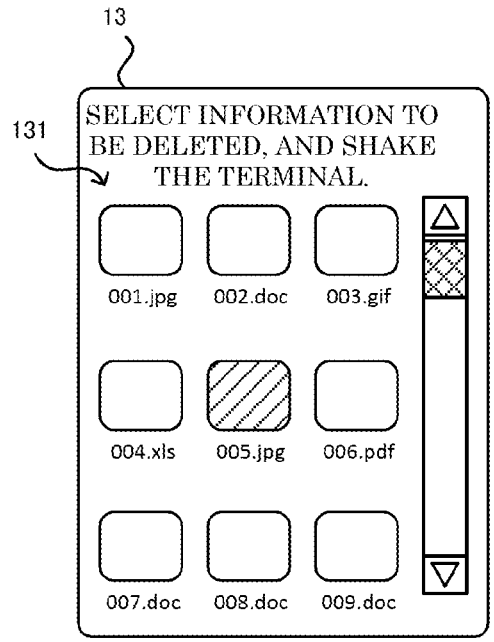
FIG. 5A, FIG. 5B and FIG. 5C are diagrams showing examples of execution results of the information selection process that is executed by the mobile terminal according to the fourth embodiment of the present disclosure.

Specifically, suppose that the mobile terminal 10 is shaken in the state where information "005.jpg" is selected by the touch operation of the user from among the nine pieces of information "001.jpg", "002.doc", "003.gif", "004.xls", "005.jpg", "006.doc", "007.doc", "008.doc" and "009.doc" displayed in the candidate display area 131 of the operation display portion 13, as shown in FIG. 5A.

Figure 5B:
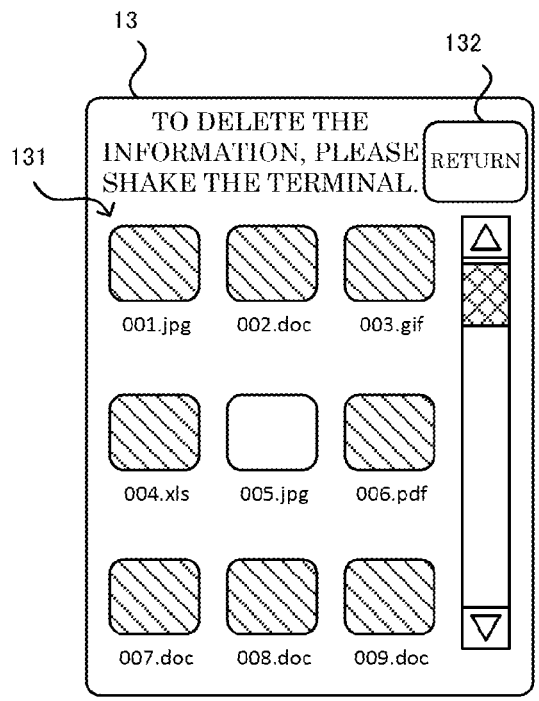

In that case, as shown in FIG. 5B, the control portion 11 selects, as the processing targets, eight pieces of information "001.jpg", "002.doc", "003.gif", "004.xls", "006.doc", "007.doc", "008.doc" and "009.doc" other than "005.jpg" that is currently selected.

Figure 5C:
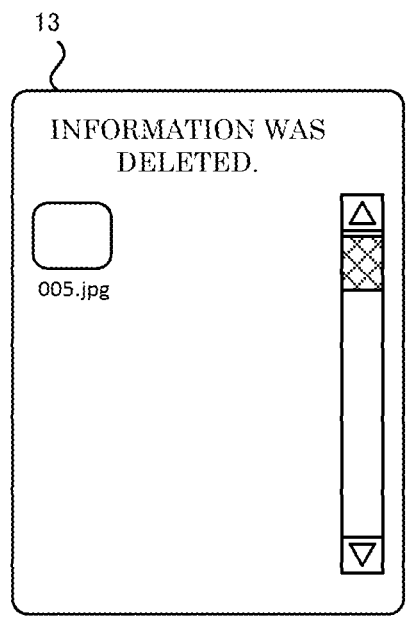

Subsequently, when the motion of shaking the mobile terminal 10 is detected in the operation state shown in FIG. 5B, the eight pieces of information "001.jpg", "002.doc", "003.gif", "004.xls", "006.doc", "007.doc", "008.doc" and "009.doc" that have been selected as the processing targets are deleted as shown in FIG. 5C.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. A mobile terminal comprising:
a motion detecting portion configured to detect a motion of shaking the mobile terminal and a direction toward which the mobile terminal was shaken;
a display processing portion configured to display a plurality of pieces of information on a display portion as selection candidates;
a touch detecting portion configured to detect a touch operation that is performed to select a piece of information from the plurality of pieces of information; and
a selection processing portion configured to, when the motion detecting portion has detected the motion of shaking the mobile terminal while the plurality of pieces of information are displayed on the display portion, select, as processing targets, one or more pieces of information from the plurality of pieces of information based on the direction toward which the mobile terminal was shaken that was detected by the motion detecting portion and a position of the piece of information selected by the touch operation detected by the touch detecting portion, wherein
the selection processing portion selects, from the plurality of pieces of information, all of one or more pieces of information that are positioned more on a side of the direction toward which the mobile terminal was shaken than the piece of information selected by the touch operation detected by the touch detecting portion, and deletes all of the selected one or more pieces of information.

2. The mobile terminal according to claim 1, wherein when an acceleration or a movement amount of a movement of the mobile terminal detected by the motion detecting portion is equal to or larger than a predetermined amount, the motion detecting portion detects the movement as the motion of shaking the mobile terminal.

3. The mobile terminal according to claim 1, wherein after deleting the one or more pieces of information that were selected when the motion detecting portion detected the motion of shaking the mobile terminal, the selection processing portion does not select or delete information even if the motion detecting portion detects a next motion of shaking the mobile terminal, until a predetermined wait time passes after the motion detecting portion detects the motion of shaking the mobile terminal, and
when the motion detecting portion detects another motion of shaking the mobile terminal after the predetermined wait time passes, the selection processing portion deletes information that is selected by the other motion of shaking the mobile terminal.

4. A mobile terminal comprising:
a motion detecting portion configured to detect a motion of shaking the mobile terminal;
a display processing portion configured to display a plurality of pieces of information on a display portion as selection candidates;
a touch detecting portion configured to detect a touch operation that is performed to select a piece of information from the plurality of pieces of information; and
a selection processing portion configured to, when the motion detecting portion has detected the motion of shaking the mobile terminal while the plurality of pieces of information are displayed on the display portion, select, as processing targets, all of one or more pieces of information other than the piece of information selected by the touch operation detected by the touch detecting portion, and deletes the selected one or more pieces of information.

5. The mobile terminal according to claim 4, wherein when the motion detecting portion detects the motion of shaking the mobile terminal after the selection processing portion displays a confirmation message to confirm whether or not it is necessary to delete the one or more pieces of information selected by the selection processing portion, the selection processing portion deletes the selected one or more pieces of information.

6. A selection processing method executed in a mobile terminal that includes a display processing portion configured to display a plurality of pieces of information on a display portion as selection candidates and a touch detecting portion configured to detect a touch operation that is performed to select a piece of information from the plurality of pieces of information, the selection processing method comprising:
a motion detecting step of detecting a motion of shaking the mobile terminal and a direction toward which the mobile terminal was shaken; and
a selection processing step of, when the step of detecting has detected the motion of shaking the mobile terminal while the plurality of pieces of information are displayed on the display portion, selecting, as processing targets, one or more pieces of information from the plurality of pieces of information based on the direction toward which the mobile terminal was shaken and a position of the piece of information selected by the touch operation detected by the touch detecting portion, wherein
the selection processing step selects, from the plurality of pieces of information, all of one or more pieces of information that are positioned more on a side of the direction toward which the mobile terminal was shaken than the piece of information selected by the touch operation detected by the touch detecting portion, and deletes all of the selected one or more pieces of information.

7. A selection processing method executed in a mobile terminal that includes a display processing portion configured to display a plurality of pieces of information on a display portion as selection candidates and a touch detecting portion configured to detect a touch operation that is performed to select a piece of information from the plurality of pieces of information, the selection processing method comprising:
a motion detecting step of detecting a motion of shaking the mobile terminal; and
a selection processing step of, when the step of detecting has detected the motion of shaking the mobile terminal while the plurality of pieces of information are displayed on the display portion, selecting, as processing targets, all of one or more pieces of information other than the piece of information selected by the touch operation detected by the touch detecting portion, and deleting the selected one or more pieces of information.

8. The mobile terminal according to claim 1, wherein the mobile terminal can communicate with an external apparatus, and the selection processing portion can select, as processing targets, one or more pieces of information from information stored in the external apparatus.

\* \* \* \* \*